United States Patent [19]

Has et al.

[11] Patent Number: 4,527,026
[45] Date of Patent: Jul. 2, 1985

[54] DEVICE FOR MOVING AN ELEMENT BETWEEN TWO END POSITIONS BY MEANS OF AN ENERGY BUFFER

[75] Inventors: Peter V. Has, Haaksbergen; Arend J. W. Lammers, Hengelo, both of Netherlands

[73] Assignee: Hazemeijer B.V., Hengelo, Netherlands

[21] Appl. No.: 544,647

[22] Filed: Oct. 24, 1983

[30] Foreign Application Priority Data

Oct. 25, 1982 [NL] Netherlands ............... 8204110

[51] Int. Cl.[3] .................. H01H 3/22; H01H 5/06
[52] U.S. Cl. ........................... 200/78; 200/144 B; 74/2
[58] Field of Search ......... 74/2; 200/144 B, 153 SC, 200/288, 70, 71, 78

[56] References Cited

U.S. PATENT DOCUMENTS

| | | | |
|---|---|---|---|
| 1,872,382 | 8/1932 | Aalborg et al. | 335/172 |
| 2,459,077 | 1/1949 | Jeffrey | 200/70 |
| 2,822,439 | 2/1958 | Schaefer et al. | 200/70 |
| 2,984,065 | 5/1961 | Stuhler | 200/153 SC |
| 3,053,950 | 9/1962 | Dobes | 200/78 |
| 3,218,409 | 11/1965 | Lindsay | 335/154 |
| 3,811,022 | 5/1974 | Guidosh | 200/144 B |

FOREIGN PATENT DOCUMENTS

| | | |
|---|---|---|
| 490173 | 1/1930 | Fed. Rep. of Germany . |
| 509949 | 10/1930 | Fed. Rep. of Germany . |
| 2702962 | 7/1978 | Fed. Rep. of Germany . |
| 2092316 | 12/1971 | France . |
| 2449963 | 9/1980 | France . |
| 347244 | 8/1960 | Switzerland . |

Primary Examiner—John W. Shepperd
Attorney, Agent, or Firm—Watson, Cole, Grindle & Watson

[57] ABSTRACT

Device for moving an element between two end positions and for selectively holding this element alternately in one of these positions, comprising an energy buffer mechanically coupled with this element, which buffer may be in one of two corresponding stationary end states, in which the energy is present in the form of potential energy, and in intermediate translation states, in which potential energy is transformed in kinetic energy and vice versa, a mass driven by the energy buffer and moved to one of the two end positions, and locking means for each of the two end states of the energy buffer. According to the present invention the mass is movable elastically over a predetermined distance with respect to the energy buffer and with respect to the element, so that when the element reaches one of its end positions the mass can move further over a predetermined distance towards its end position, thus transforming all kinetic in potential energy. Preferably the energy buffer is a helical spring, housed in a cylindrical mass. Each spring end is received in a spring support, which rests upon an inward end flange of the mass. Each spring support may cooperate with a stationary stop, mounted on the housing wall, which stop can enter the mass through an opening in the said flanges, to arrest the spring supports. The movable element may be formed by one of these spring supports, and may operate the movable switch contact of an electrical switch.

6 Claims, 6 Drawing Figures

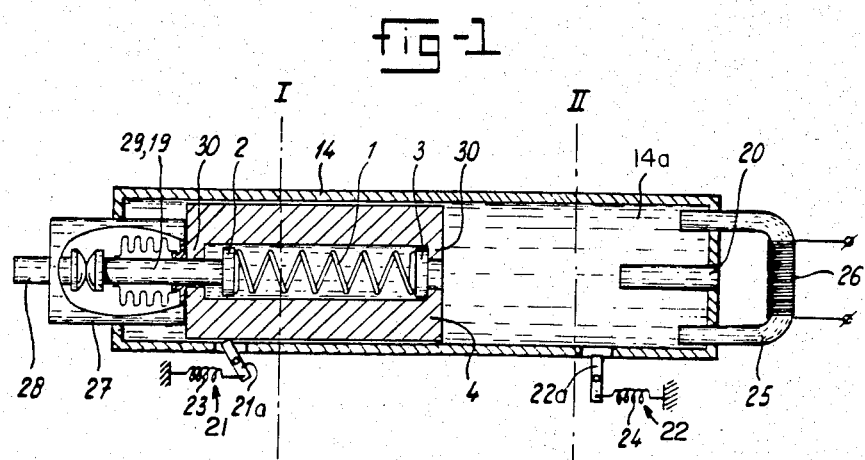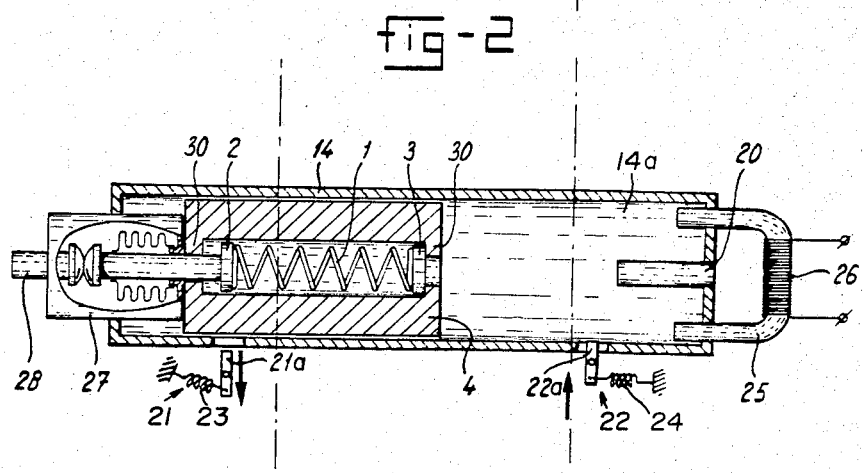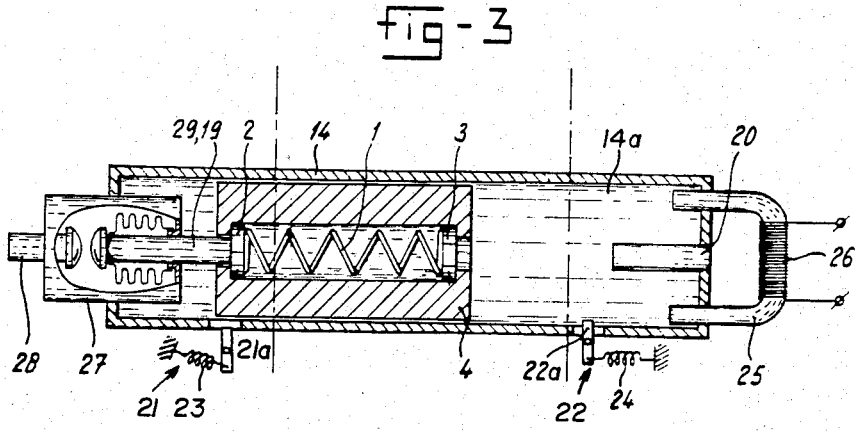

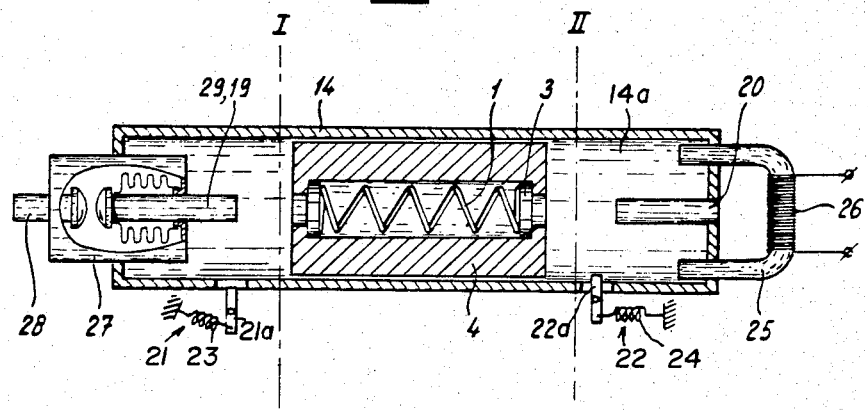
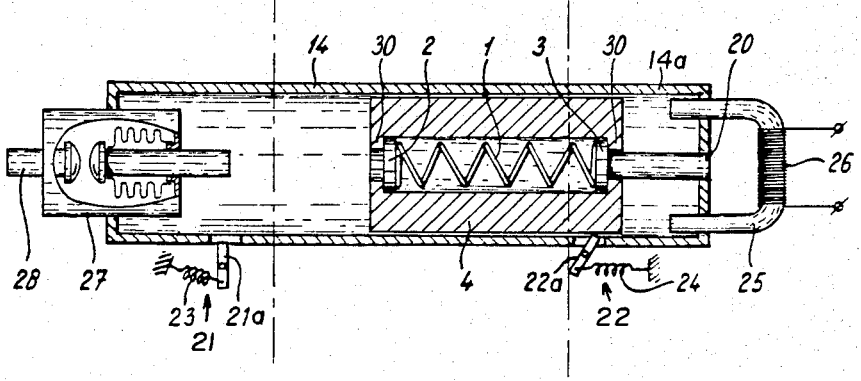
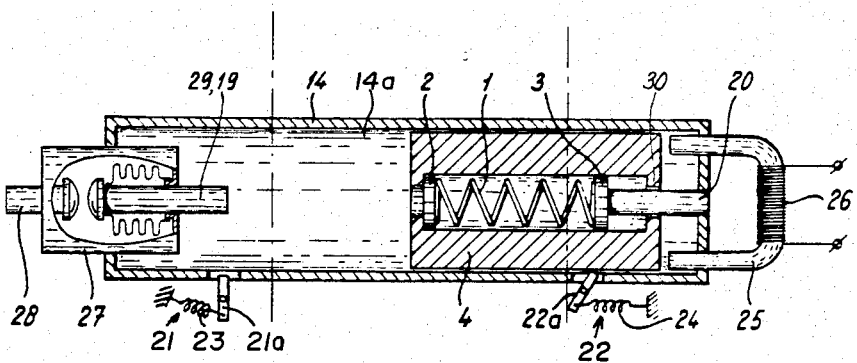

DEVICE FOR MOVING AN ELEMENT BETWEEN TWO END POSITIONS BY MEANS OF AN ENERGY BUFFER

BACKGROUND OF THE INVENTION

1. Field of the Invention

The present invention relates to a device for moving an element between two end positions and for selectively holding this element alternately in one of these end positions, the device comprising an energy buffer mechanically coupled with the element, the buffer capable of being in one of two corresponding stationary end states where the energy present therein is completely in the form of potential energy, as well as in intermediate translation states where its energy is in the form of kinetic energy that has been derived from the potential energy; a mass which is driven by the energy buffer and moved to one of two end positions which correspond with the end states of the energy buffer; locking means for each of the two end states of the energy buffer, i.e., in order to hold the element in one of its positions; and energy supply means for the energy buffer.

2. The Prior Art

Such a device is shown in U.S. Pat. No. 3,248,497. The device is used for operating a switch, the element being the movable contact of the switch or the drive for this contact.

This element consists of a rod, one end of which is fixedly coupled with the connecting portion of a fork, the teeth of which consists of flat parallel strips. The other end of the rod supports the movable contact of the switch. The fork together with the element and the contact can be moved in its longitudinal direction and can be seen partly as the above-noted mass, in combination with the element and contact.

A helical spring is positioned between a spring support, mounted on the rod, and the wall of a housing passed by the rod. The spring and the bellows and the air pressure acting upon the bellows function as the above-noted energy buffer. This helical spring, in combination with the air pressure acting upon the bellows of a vacuum switch, is dimensioned such that, when the element, i.e., the switch, the rod and fork is locked in one of the two end positions of a longitudinal movement, a force is always acting hereupon, which force in each of these extreme positions drives the contact with the same force backward to an intermediate position. Consequently, in these extreme positions an amount of potential energy is stored in the bellows with the air pressure acting thereupon or in the helical spring. As soon as the locking in one of the extreme positions is removed, this contact is driven in the other direction, while transforming potential energy in the helical spring or in the bellows and the air pressure acting thereupon into kinetic energy, which results in a movement of the fork, the rod and the contact. This movement will be in the switch on or switch out direction, depending on the prior position.

Adjacent the connecting portion of the fork a first cross pin is fixedly mounted between the parallel strips, forming the teeth of the fork. The intermediate portion of this pin passes a slot in a triangular plate, also mounted between the teeth of the fork, which plate can swing about a second cross pin, positioned adjacent the free ends of the noted teeth of the fork. The distance from the slot to the swing point, i.e., the second cross pin, may vary, so that when the swing plate is swinging, the fork and the rod connected thereto, as well as the contact, will be moved in their longitudinal direction. Hence the contact can be moved between one of its extreme positions. Therefore the switch can be switched on or switched out, respectively, by the swinging movement of the plate. The swing plate can be swung to the one position by means of an electromagnet and is held in the other swing position by means of a draw spring, as long as the electromagnet is switched off.

Upon swinging movement of the plate in order to switch on or switch out the switch, a part of the displacement energy for the contact will be supplied by the potential energy, caused by the spring force of the stored potential energy in the spring between the wall of the housing and the spring support or in the bellows and the air pressure acting thereupon, all acting upon the contact, the rod and the fork. The spring forces acting upon the switch contact and the moving mass are tuned such to one another, that the correct switch velocity will be reached and the least possible energy will be lost as collision energy. This will result in a minimum of contact deformation caused by contact collision.

Special means will be necessary to provide the contact pressure, because none of the springs, contributing to the contact movement can provide this contact pressure. Also with this special means possible contact deformation and/or contact wear can be compensated. These means consist of a lever which extends transversely to the longitudinal direction of the fork and which can swing about a point at one of its ends. The lever extends between the free ends of the parallel teeth of the fork and here supports the second cross pin, about which the swing plate can swing. The two free ends of this second cross pin traverse longitudinal slots in the free ends of the said fork teeth. A pressure spring acts on the free end of the lever, pushing upwards the lever and therewith the swing plate, the fork via the first cross pin and also the contact. This provides for the necessary contact pressure and compensates contact wear and contact deformation.

As a matter of course these last noted means should be made inoperable as soon as the switch is switched off. Thereto the free end of the lever cooperates with the magnetic means which secure the lever when reaching the lowest position upon switching off, in which the lever is pressed downwards by the fork through the second cross pin and by the upper edges of these transverse slots.

SUMMARY OF THE PRESENT INVENTION

The present invention aims at improving and at the same time simplifying the known device, at the same time maintaining all advantages. The device of the present invention is characterized in that the mass is movable elastically over a predetermined distance with respect to the energy buffer and with respect to the element, so that when the element reaches one of its positions the mass can be moved further over a predetermined distance towards its belonging end position, thus transforming kinetic in potential energy, the locking means gripping and holding the mass in its end positions.

An end position of the mass is a position which can be reached by the mass at the utmost, because of its kinetic energy, in which position nearly all kinetic energy will be transformed in potential energy.

The device of the present invention operates with much less moving parts, has no hinges, whereas only one energy buffer need to be used. Because the mass can be displaced further after the movable element has reached its end position, an additional pressure force will be exerted upon the element and wear and deformation of the contacts will be compensated for automatically.

Not locking the mass until it has reached its end positions means that nearly no energy will be lost as collision energy, so that more energy will be stored in the energy buffer for moving the element again in the opposite direction. Upon using in a switch this has the advantage that the movement upon opening the switch will take place at a sufficient velocity. The two contacts meet each other in the switch with a high speed, namely the moving speed of the mass. The element itself, however, can be moved with respect to the mass and has in itself a low mass, so that only a small amount of collision energy needs to be absorbed. After the contacts have come in contact with one another, the mass will move on further, building up immediately sufficient contact pressure, which also suppresses contact vibrations. This also is reached by simple means.

In a preferred embodiment of the present invention the device comprises a housing, at least one mass movable within the housing and an energy buffer cooperating with the mass, the opposite ends of the energy buffer being arrested by two end members cooperating with and moving with the mass, at least one stop being stationary with respect to the housing and positioned adjacent one of the end positions of the mass in the housing, such that the end of the energy buffer facing this end position and the belonging end member are arrested by this stop when the mass is moving toward this stop, whereas the mass will move further towards its belonging end position by the remaining kinetic energy storing further potential energy in the energy buffer, in which one of the end members is coupled with the movable element.

In a further preferred embodiment the mass is hollow, the energy buffer being located within this mass. The stop, being stationary with respect to the housing, can enter within the mass over a certain distance when the mass is moving in the direction towards the stop, in which the stop end collides against an end member in the hollow mass.

Preferably the energy buffer consists of a helical spring, extending in a hollow cylindrical space in a cylindrical mass, each spring end being received in a spring support, each support resting upon arrester means connected to the mass and directed inwardly with respect to the hollow space, in which at least one spring support cooperates with a stop mounted on the housing which may enter in the hollow space through a passage in the mass, in which a movable element is connected with one of the spring supports and extends to the exterior of the mass through a belonging passage in the mass.

The device of the present invention is intended firstly for operating a switch. However, it will be self-evident that this device is not limited hereto. For instance, instead of a switch a valve for a gas or liquid can also be operated.

Also the energy buffer need not consist of a helical spring, as shown in the specification and figures following hereafter. Instead of a helical spring pneumatic means can be used for instance, as long as the said operating conditions are met.

The invention now will be further elucidated on the basis of the accompanying drawings.

DESCRIPTION OF THE DRAWINGS

In the drawings,

FIGS. 1-6 show a device according to a preferred embodiment of the present invention in successive operational stages.

DETAILED DESCRIPTION OF THE PREFERRED EMBODIMENT

The shown device comprises an energy buffer formed as a spring 1 which is tensioned between a first spring support or actuation element 2 and a second spring support or support means 3. The spring 1 and spring supports 2 and 3 are located in a cylindrical space within a mass 4. This mass, which also can be of cylindrical shape, can be moved rectilinearly within the cylindrical channel 14a a cylindrical housing 14. The spring supports 2 and 3 are arrested by interiorly directed flanges 30 of the mass.

The mass can be moved within this housing 14 in alternative opposite directions between a stop 19 at the left end in the Figures and a stop 20 at the right end in the Figures. The stop 19 is actually the movable actuation rod 29 of a vacuum switch 27 which is mounted in an opening in the housing 14 at the left end of the cylindrical channel 14a, the vacuum switch also including a stationary rod 28, whereas the stop 20 is mounted on the housing 14 to extend inwardly from the right end of the cylindrical channel 14a. The noted apparatus defines two end positions I and II.

In both end positions to the left and to the right of the cylindrical channel 14a, the mass 4 can be held in position by schematically shown locking means 21 and 22. These locking means may comprise, for instance, wedges 21a and 22a which are rotatable about a central axis and which also can be moved in a longitudinal through openings in the housing 14, i.e., in a direction towards and away from the mass 4. The locking means 21 and 22 also include draw springs 23 and 24 which are connected to the ends of these wedges 21a and 22a which extend away from the mass 4.

In the position shown in FIG. 1 the energy buffer comprises stored potential energy in the form of a compressed helical spring 1, and in this position the mass 4 is held in the left-hand end position I by locking means 21. In this position the vacuum switch 27 is closed. The wedge 21a, in uppermost position and tilted to the left by the mass 4 which has previously moved to the left, is pressed by the drawn spring 23 with its right-hand upper edge against the outer wall of the mass 4. Consequently this mass cannot be moved to the right and remains locked in the shown position, i.e., until wedge 21a is moved downwardly again.

In FIG. 2 the locking action of wedge 21a is removed by moving this wedge downwardly, whereas at the same time at the side of the end position II a similar locking means 22 with wedge 22a is prepared for the same locking action. The helical spring 1 moves the mass 4 to the position shown in FIG. 3. In this position the potential energy is transformed completely into kinetic energy, moving the mass 4 further to the end position II. FIG. 4 shows an instantaneous position.

In FIG. 5 the spring support 3 and also an element connected to this spring support has reached the end position II. However, mass 4 still contains all kinetic energy driving further this mass, now, however, simultaneously transforming kinetic energy into potential energy, which is stored by compressing helical spring 1.

In FIG. 6 all kinetic energy is transformed into potential energy and the velocity of mass 4 is reduced to zero again. At the same moment this mass 4 will reverse direction of movement under the influence of the potential energy in the helical spring 1. As soon as wedge 21a, as shown in FIG. 2, is moved downwardly for unlocking mass 4, wedge 22a will move upwardly, shown with the arrow in FIG. 2, to be thus prepared for locking action. In FIG. 5 mass 4 is moved that far to the right end that the prepared wedge 22a will be tilted to the right by the outer edge of moving mass 4. As soon as mass 4 in FIG. 6 reaches its end position and starts to move to the left again by the potential energy stored in helical spring 1, this movement is counteracted by means of the upper edge of wedge 22a pressed against mass 4 by means of spring 24. Mass 4 is held in that position until wedge 22a is moved downwardly again upon unlocking.

In the ideal situation, which means without frictional losses and the like, the device, after having received sufficient energy once only, would remain in operation indefinitely. However, because in practice mechanical losses never can be avoided energy will have to be supplied to the device, for instance after each cycle, consisting of one to and fro movement of mass 4, because by these losses the mass will not reach its original starting position. However, because in the present invention upon each cycle of movement always a maximum conversion will take place of potential into kinetic energy and vice versa in potential energy again, this energy supply can be minimum and only the losses need be compensated for.

Energy may be supplied for instance as additional potential energy in the energy buffer when being at the end positions I or II, or as additional kinetic energy upon movement to one of its end positions. In the first case, the mass after almost or mainly reaching one of the end positions, for instance after returning in end position II, can be pulled to its original end position by means of an electromagnet 25 having an excitation coil 26. Also, for instance, additional acceleration energy can be supplied to the moving mass by means of an electromagnet (not shown) surrounding the housing.

By means of the present invention it can be attained in a simple way that wear, deformation and such, enlarging the mutual distance between the end positions, is compensated automatically, without any further adaptation, readjustment or the like being necessary.

As a matter of course the locking wedges 21 and 22 also can be replaced by other mechanical or electrical locking means.

Also other modifications are possible within the scope of the present invention. For instance, mass 4 may be formed in another manner than the shown hollow cylinder. This mass for instance may consist of a ring surrounding spring 1. The mass need not be hollow and the spring also can be mounted at the exterior of the mass. Also spring 1 can be subdivided.

We claim:

1. A device for operating a movable actuation rod of a switch, said device comprising
   a housing having opposite first and second housing ends, said first housing end being capable of mounting thereon a switch having said movable switch actuation rod extending at least partly into said housing, said housing including stop means at the second housing end,
   a mass movably positioned in said housing, said mass having opposite first and second mass ends,
   an actuation element at the first mass end and capable of driving said switch actuation rod,
   a support means at the second mass end and capable of cooperating with said stop means,
   means arresting movement of said actuation element and said support means along said mass,
   an elastic energy storage means associated with said mass through said actuation element and said support means,
   a first locking means for said mass associated with said mass to hold said mass in a first mass end position nearest the first housing end at the moment the kinetic energy of said mass will be zero,
   a second locking means for said mass associated with said mass to hold said mass in a second mass end position nearest the second housing end at the moment the kinetic energy of said mass will be zero,
   an energy supply means associated with said housing,
   said mass being movable within said housing between said first mass end position nearest the first housing end and said second mass end position nearest the second housing end, thus transforming potential energy into kinetic energy and vice versa; and when a switch with movable switch actuation rod is mounted at the first housing end, such that its actuation rod extends into said housing, said device will operate as follows:
   (1) just before said mass will be locked in said first mass end position by said first locking means and after said switch actuation rod has pushed said actuation element to an end position nearest the second mass end, thereby concurrently moving said switch actuation rod inwardly of said switch to an end position defined by the closed state of said switch, said mass will convert its remaining kinetic energy into potential energy while further moving into the first housing end position, thereby compressing said energy storage means and increasing its stored potential energy,
   (2) when said first locking means releases said mass, said energy storage means will expand, causing said mass to move toward the second housing end, its storage potential energy being converted to kinetic energy, said switch actuation rod at the same time being allowed to move outwardly of said switch,
   (3) just before said mass will be locked in said second mass end position by said second locking means and after said stop means has pushed said support means towards said actuation element and caused said support means to take up an end position farthest from the second mass end, said mass will convert its remaining kinetic energy into potential energy while further moving to its second mass end position, thereby compressing said energy storage means and increasing its stored potential energy, and
   (4) said energy supply means adding energy to said energy storage means when said mass is in its second end position to maintain the potential energy stored therein at a constant value, whereby said mass is moved from said second end position to said first end position substantially solely by the stored potential energy of said elastic energy storage means.

2. A device as claimed in claim 1, wherein said energy supply means comprises an electromagnet.

3. A device as claimed in claim 1, wherein said elastic energy storage means comprises a helical spring.

4. A device as claimed in claim 3, wherein said helical spring is positioned to extend between said support means and said actuation element.

5. A device as claimed in claim 4, wherein said actuation element is located in a space within said mass near the first mass end, wherein said support means is located in said space within said mass near the second mass end, and wherein said stop means comprises a rod extending inwardly of said housing and capable of extending through an opening in the second mass end to contact said support means.

6. A device as claimed in claim 5, wherein said housing includes openings therein near its opposite first and second housing ends, and wherein said first and second locking means include wedges which can extend through said respective openings in said housing to hold said mass in said first and second mass end positions.

* * * * *